---

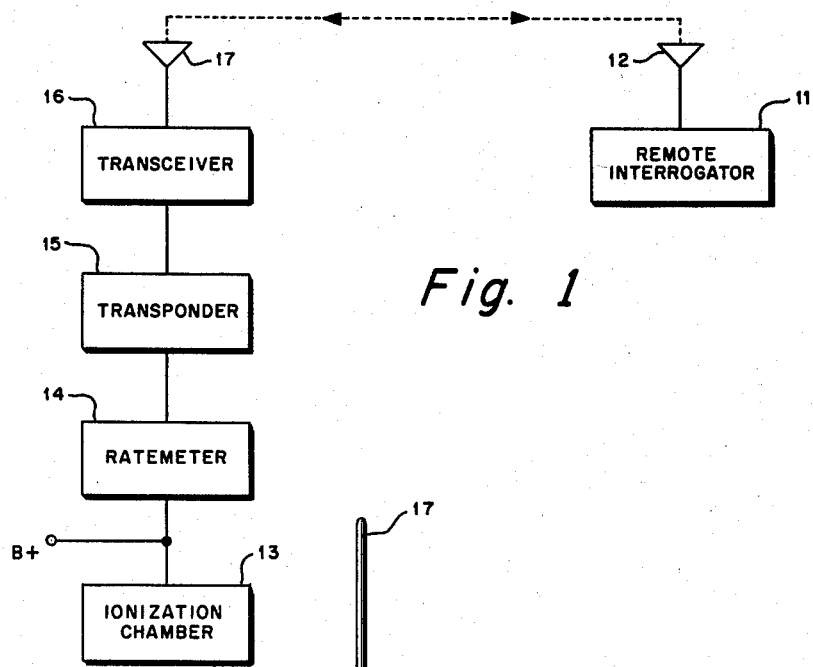
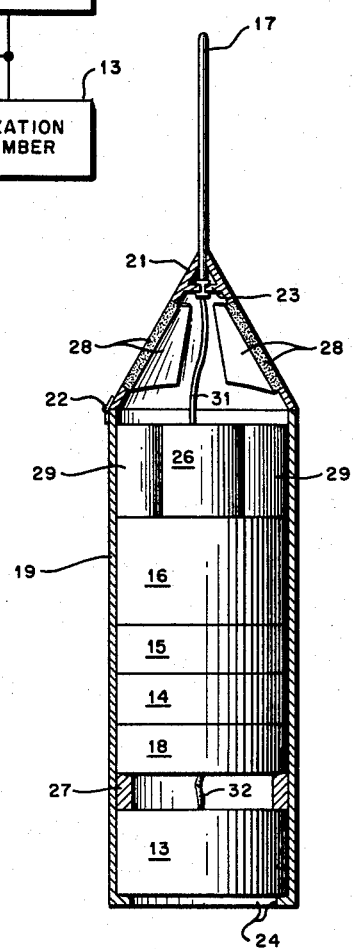

3,178,577
REMOTE RADIOACTIVE MONITOR AND TRANSMITTING MEANS
George E. Wilcox, 28 New Road, Doylestown, Pa.
Filed Feb. 27, 1962, Ser. No. 176,163
2 Claims. (Cl. 250—83.6)
(Granted under Title 35, U.S. Code (1952), sec. 266)

The invention described herein may be manufactured and used by or for the Government of the United States of America for governmental purposes without the payment of any royalties thereon or therefor.

This invention relates to a radiation detector and more particularly to an unattended nuclear radiation monitor.

After a nuclear attack, one of the major functions of the Civil Defense Program is to ascertain areas in which the nuclear radiation is at a level dangerous to life. The ascertaining and mapping of safe and unsafe areas of nuclear radiation may become vital to the survival of great numbers of people, animals, and other living matter. Therefore, in order to be most effective, such a vital Civil Defense function should be initiated immediately after a nuclear attack and in many cases it would be advisable to be begun in the midst of a prolonged nuclear attack by an enemy.

The method available today for monitoring areas of nuclear radiation of the use of volunteer personnel utilizing hand carried detection equipment. It is now contemplated that these personnel should immediately after a nuclear attack assemble at a central station or headquarters and thence with such nuclear radiation detecting equipment that may be available go out into the field at great personal danger. These personnel would then report back to the headquarters by various means the radiation levels in the area surveyed by each and the headquarters would then integrate and assemble such information into maps or records indicating areas or patterns of radiation wherein safe and unsafe radiation levels exist. Assuming highly trained and courageous monitoring personnel in sufficient supply, such an operation would at best be hazardous and inefficient.

The present invention contemplates a device capable of detecting radiation at remote locations and upon being interrogated transmits the radiation data from the area in which it is located to a central station. By strategically placing a plurality of devices of the present invention at various locations covering a wide area which it is desired to monitor, the central station by means of a master console may interrogate each device individually to obtain readout information of nuclear radiation at each installation. By this means it is possible to determine general patterns of radiation hazards without dispatching personnel into the area which may be unpredictably "hot" due to radioactive fallout. The information received by this method at the central station may be integrated and assembled to map or otherwise record during or immediately after a nuclear attack. Such a system would also provide a means for continuously rechecking the various locations so that the map or other recording system may continuously be brought up to date.

Aside from substantially replacing monitoring personnel, the device of the present invention provides a fast, inexpensive, efficient, accurate and reliable device for monitoring the nuclear radiation.

The present invention contemplates the combination of a ionization chamber, rate meter circuitry, radio transmitter and receiver, packaged in a low cost, compact, self-contained structure capable of temporary or permanent mounting on any convenient support at a strategic location. Although the radiation monitoring device, per se, forms a major portion of this invention, it is pointed out that a system composed of a plurality of such devices used in conjunction with a central interrogating station is an important feature of the present invention.

An object of the present invention is the provision of a nuclear radiation monitoring device remotely located and unattended which is capable of detecting nuclear radiation and of transmitting the same upon being interrogated by a remotely located central station.

Another object of the present invention is to provide a self-powered, self-contained radiation detector wherein data indicative of radiation levels is detected and converted into a transmittable quantity.

A further object of the present invention is the provision of an inexpensive, efficient, and reliable radiation monitoring device which provides rapid and accurate radiation level information without the need for human monitors entering unpredictably dangerous areas.

Still another object of the present invention is the provision of a radiation monitoring system wherein a plurality of unattended monitors strategically placed will each provide necessary information to a central interrogator station whereby general patterns of areas of dangerous radiation levels may be plotted or otherwise recorded.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates in block diagram the system of the present invention.

FIG. 2 illustrates the configuration partly in cross section of the nuclear radiation monitoring device of this invention.

Referring now more particularly to FIG. 1, there is shown the system contemplated by this invention. As is seen by reference to FIG. 1, the system of this invention comprises an ionization chamber 13 connected to a rate meter 14 which has its output connected to a transponder 15, the output of which is connected to transceiver 16. Transceiver 16 is a transmitter-receiver which via antenna 17 may receive coded interrogating pulses from a remotely located interrogator 11. The coded pulses from interrogator are transmitted via antenna 12 and when received by transceiver 16 cause transceiver 16 to transmit radiation data back to remote interrogator 11. For purposes of this disclosure, ionization chamber 13, as shown in FIG. 1, may be thought of as also including the necessary transformer arrangement for transforming the voltage of the power supply B+ to a high voltage whereby the ionization chamber 13 is made an active radiation detector.

When the ionization chamber 13 is in the presence of radiation, pulses from the chamber are fed into rate meter circuit 14. The pulses are amplified in a conventional rate meter circuit which is calibrated logarithmically to provide a proportional output having a wide range of response with equal sensitivity to all levels of radiation. The output of rate meter 13 is then fed to a transponder circuit 15 which converts changes in current, which are indicative of radiation level, to a transmittable form such as pulse width or frequency. A receiver operating continuously accepts a coded actuating command from remote interrogator 11 to energize the transmitter of transceiver 16 to cause it to transmit the radiation data as detected by ionization chamber 13, measured by rate meter 14, and converted with a transmittable quantity in transponder 15 back to the interrogator. At the central station, the remote interrogator 11 comprises a transmitter which sends the coded interrogation and a receiver which receives the radiation level information and converts it to a signal capable of being directly indicated as by a meter or recorded on a tape or chart.

Referring now more particularly to FIG. 2, there is shown a preferred embodiment of the monitoring device of the system of the present invention. An elongated, cylindrical container 19 houses the various elements shown in FIG. 1. The housing 19 may be provided with mounting brackets for mounting on telephone poles, light stands, etc. The housing 19 is provided with a pyramidal cap 21 which is hinged to housing 19 as at 22 to provide easy access to the components within housing 19. The cap 21 is steeply sloped to reduce fallout accumulation. Mounted as by brackets 23 is antenna 17.

The bottom of the housing 19 is an open grating 24 which while providing mechanical protection permits both beta and gamma rays to impinge on the window of the ionization chamber 13. Battery 26 supplies power to rate meter 14, transponder 15, and transceiver 16. Battery 26 also supplies power via power transformer 18 to ionization chamber 13. Since ionization chamber 13 is a conventional type, it requires high voltage for operation. Power transformer 18 is a transistorized type power supply utilizing an oscillator-transformer combination for boosting the voltage from the battery to a level sufficient for operation of the ionization chamber. Blocks 27 are electrothermal insulators for spacing ionization chamber from power transformer 18.

In order to prolong unattended operation of the monitoring device of the present invention, cap 21 is provided with solar cells 28 for converting solar energy directly to electrical energy. Solar cells 28 provide electrical energy to conventional type battery rechargers 29 which recharge battery 26.

Antenna wire 31 is directly connected to the output of transceiver 16. Wire 32 is symbolic of the electrical connection between power transformer 18 and ionization chamber 13. All other electrical connections may, of course, be made in any convenient manner and for that reason are not shown.

Obviously many modifications and variations of the present invention are possible in the light of the above teachings. It is therefore to be understood that within the scope of the appended claims the invention may be practiced otherwise than as specifically described.

What is claimed is:

1. A device for measuring radioactive radiation at a location remote from a central monitoring station, comprising in combination:
   a cylindrical housing including,
   an ionization chamber at the bottom portion of said housing having an electrical pulse output of a variable frequency and amplitude indicative of the ambient radiation level,
   rate meter means for converting the pulse output of said ionization chamber into a continuous electrical current which varies with the level of ambient radiation,
   transponder means for converting said electrical current into a transmittable modulating signal whose frequency varies with the radiation level,
   transceiver means for transmitting said modulating signal upon interrogation thereof by a coded pulse received from the central monitoring station,
   battery means for supplying electrical energy to said device,
   cone-shaped cap means secured to said housing and forming the upper portion thereof for reducing fallout accumulation on said device,
   solar cell means formed in said cap means converting solar energy into electrical energy for continuously recharging said battery means,
   whereby said device transmits upon receipt of an interrogating pulse a signal representative of the instantaneous level of radiation from the specific area of location.

2. A system for measuring levels of radioactive radiation at various locations remote from a central monitoring station, comprising in combination:
   a plurality of radiation detection devices strategically located at predetermined positions within a given area,
   each of said radiation detecting devices comprising a cylindrical housing including,
   an ionization chamber at the bottom portion of said housing having an electrical pulse output of variable frequency and amplitude indicative of the ambient radiation level,
   rate meter means for converting the output of said ionization chamber into a continuous electrical current which varies with the level of ambient radiation,
   transponder means for converting said electrical current into a transmittable modulating signal whose frequency varies with the radiation level,
   transceiver means for transmitting said signal upon interrogation thereof by a coded pulse received from the central monitoring station,
   battery means for supplying electrical energy to said device,
   cone-shaped cap means secured to said housing and forming the upper portion thereof for reducing fallout accumulation on said device,
   solar cell means formed in said cap means converting solar energy into electrical energy for continuously recharging said battery means,
   interrogating means at the central monitoring station for selectively pulsing said transceiver means of each of said devices,
   whereby said transceiver means transmits a signal representative of the instantaneous radiation level from said predetermined positions of location.

References Cited by the Examiner

UNITED STATES PATENTS

| | | | |
|---|---|---|---|
| 2,894,173 | 7/59 | Paradise | 315—86 |
| 2,958,781 | 11/60 | Marchal | 250—83.3 |
| 3,028,119 | 4/62 | Coble | 250—83.3 |

OTHER REFERENCES

Radioactive Snow Gage with Telemetering System, by Soremus, Proc. of the National Electronics Conference, vol. 6, 1950, pages 518 to 526.

Telemetering Broadens Gaging and Monitoring, Nucleonics, vol. 18, No. 4, April 1960, page 106.

RALPH G. NILSON, *Primary Examiner.*